March 30, 1943.　　　M. J. THOMAS　　　2,315,028
JUICE EXTRACTING MACHINE
Filed Oct. 27, 1941　　　2 Sheets-Sheet 1

Matthew J. Thomas
INVENTOR

BY Victor J. Evans & Co.
ATTORNEYS

March 30, 1943.                M. J. THOMAS                2,315,028
                          JUICE EXTRACTING MACHINE
                          Filed Oct. 27, 1941            2 Sheets-Sheet 2

Matthew J. Thomas
INVENTOR
BY Victor J. Evans & Co.
ATTORNEYS

Patented Mar. 30, 1943

2,315,028

UNITED STATES PATENT OFFICE 2,315,028

JUICE EXTRACTING MACHINE

Matthew J. Thomas, Los Angeles, Calif.

Application October 27, 1941, Serial No. 416,710

5 Claims. (Cl. 146—76)

This invention relates to juice extracting machines, and its general object is to provide a machine that is capable of expeditiously and completely comminuting whole fruit, vegetables or the like into pulp, from which the juice is separated, by being strained therefrom, the strained juice being directed into an outlet drainage trough or spout, while the pulp free from juice is directed to another outlet spout for passage therethrough, and the juice and pulp flow simultaneously and continuously from the machine, as long as the machine is in operation and material is fed thereto, thus unlike many juice extractors now in general use, it is not necessary to stop the operation of my machine to remove the pulp therefrom.

A further object is to provide a juice extracting machine that does not become easily clogged with pulp and seeds and can be maintained in a clean and sanitary condition with minimum effort.

Another object is to provide a juice extracting machine that has grinding or comminuting means directly connected to the armature shaft of an electric motor to be driven thereby, and the machine is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 4:
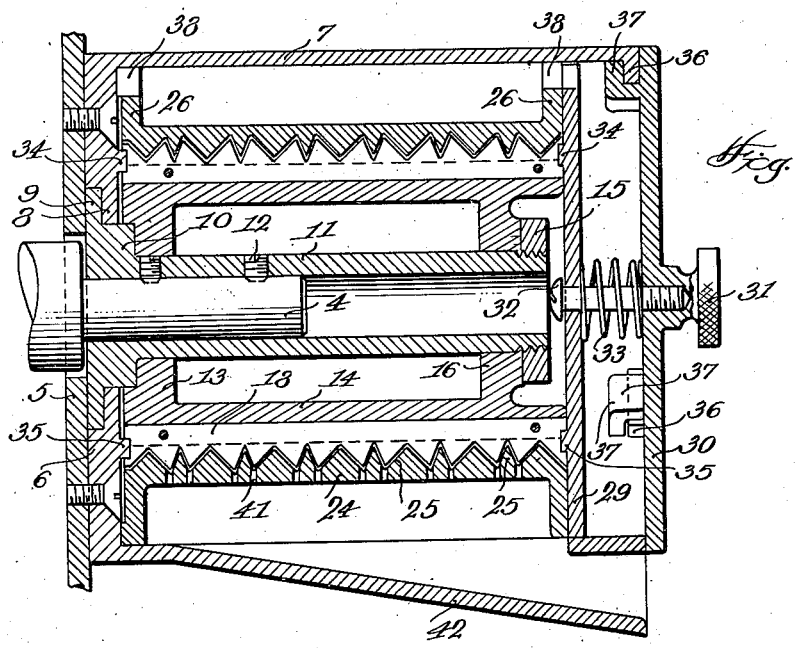
Figure 4 is a sectional view taken approximately on line 4—4 of Figure 2, looking in the direction of the arrows.

Referring to the drawings in detail, the reference numeral 1 indicates a rectangular base plate which has formed or otherwise secured thereto the base member 2 of a horizontally disposed electric motor 3, that of course is provided with a suitable switch for controlling the same, and the armature shaft of the motor includes a reduced portion 4 disposed exteriorly of the motor housing, as clearly shown in Figure 4.

Bolted or otherwise fixed to the motor housing is an attaching plate 5 having a central opening through which passes the armature shaft, and bolted to the plate 5 is the inner wall 6 of a cylindrical casing 7 which has its outer or front end closed by a detachable closure which will be later described, and when the closure is removed, the entire outer end of the casing is open to allow free access to the interior thereof, as well as to facilitate ready removal of the parts therefrom, for cleaning or repairs.

The inner or rear wall 6 has a central opening therein that registers with the opening of the attaching plate and the opening of the rear wall is provided with an annular flange 8 which forms an exterior shouldered seat having fittingly mounted therein an annular flange 9 abutting the attaching plate and formed on a hub 10 which in turn is formed on a sleeve 11 detachably secured to the reduced portion 4 of the shaft, by set screws 12. The sleeve is of a length to extend a considerable distance outwardly beyond the reduced portion 4, as well as has its outer end threaded, as best shown in Figure 4.

Removably secured to the sleeve and having its inner hub 13 bearing against the sleeve hub 10 is a hollow drum 14 of a rotary cutter, that is held on the sleeve by a nut 15 bearing against the outer hub 16 thereof, the hubs 13 and 16 fitting the sleeve for slidable movement thereon to allow ready removal of the rotary cutter together with companion parts thereof, when the nut is removed.

Figure 5:
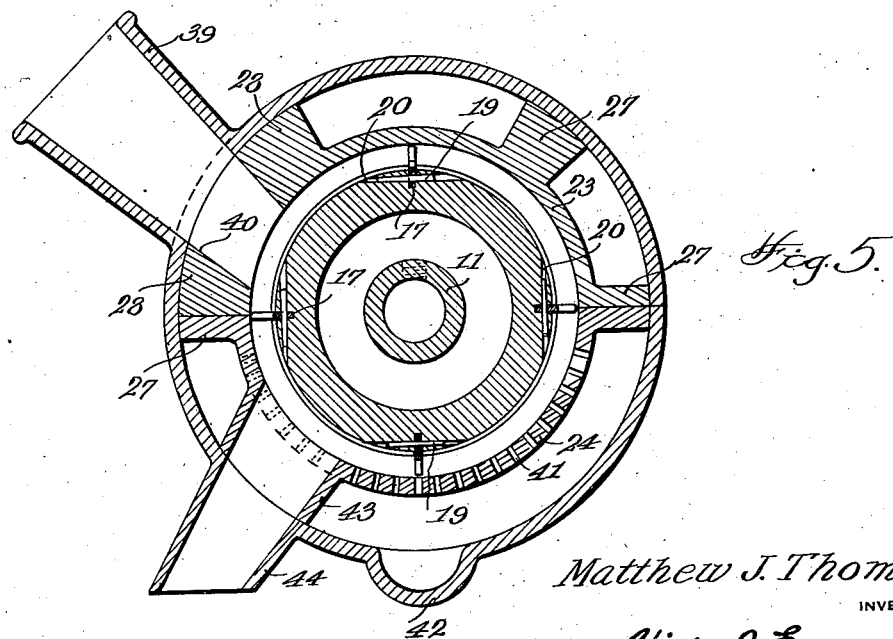
Figure 5 is a sectional view taken approximately on line 5—5 of Figure 1, looking in the direction of the arrows.

The drum is provided with at least four grooves 17 extending longitudinally thereof at equidistantly spaced relation about its circumference, and seated in the grooves are cutter blades 18 of a length co-extensive with that of the drum, the blades being removably secured within the grooves by wedge or tapered pins 19 that extend through openings in and adjacent to the ends of the blades, and the pins are mounted in tapered bores 20 that intersect the grooves and open at both ends through and tangentially of the drum, as best shown in Figure 5, so that the pins can be driven into and out of the grooves, as will be apparent. The blades are of a width to extend a considerable distance outwardly of the outer circumferential face of the drum, and the outer portions of the blades throughout their length are notched in truncated triangular formation in the form shown, to provide toothed projections 21 of substantially M-shape in outline, so that two triangular shaped teeth 22 are provided on each projection, but the teeth may be of any suitable shape and size and formed directly on the longitudinal edges of the blades by providing the latter with triangular shaped notches throughout the length thereof.

Cooperating with the blades to set up a grinding action is what I term a masticator cylinder that includes an upper section 23 and a lower section 24 and each section constitutes a half of the cylinder, as best shown in Figure 5. The inner faces of the sections are grooved as at 25, so that the grooves extend circumferentially of the cylinder, and the walls of the grooves 25 are of a shape to fit the projections 21 and the teeth 22, as well as disposed in close proximity thereto, as clearly shown in Figure 4. The masticator cylinder is held fixed against rotation, while the teeth travel in the grooves 25. Each section is formed with outwardly directed flanges 26 at the ends thereof, and formed on the outer faces of the sections in bridging relation to the flanges 26 are web members 27 and 28 which together with the flanges 26 bear against the cylindrical wall of the casing 7. By providing the masticator cylinder in sections, it will be obvious that such allows for free application and removal thereof with respect to the rotary cutter.

The inner flange 26 bears against the inner or rear wall 6 of the casing 7 and bearing against the outer flange 26 is a spring pressed disk follower plate 29 that is carried by a closure or cover plate 30 for the open end of the casing 7, the closure plate being of a diameter to engage the outer end of the casing and has the shank of a serrated knob like handle 31 formed centrally on the outer face thereof, as best shown in Figure 4. The shank has a threaded bore therein which extends through the cover plate and threaded in the bore is a headed screw bolt 32 that extends through the follower plate, the bolt having sleeved thereon a coil spring 33 bearing against the plates 30 and 29 for urging the latter in bearing relation with the masticator cylinder to prevent displacement thereof with respect to the teeth of the cutter blades, as will be apparent. The rear wall 6 and the follower plate 29 have annular ribs 34 formed thereon to provide guides for the rotary cutter, the ribs being mounted in notches 35 in the ends of the blades, for that purpose, as well as to relieve strain on the pins 19, thus preventing any possibility of endwise movement of the blades, relative to the drum.

In order to hold the cover plate latched in closed position, it will be noted that the casing 7 is formed with keeper lugs 36 for slidably receiving right angle latch members 37 formed on the cover plate, and the confronting faces of the lugs and latch members are shaped to set up a wedging action against each other, so that the cover plate will be held against casual removal or displacement. The follower plate as well as the flanges 26 have recesses 38 therein to allow for free passage thereof by the keeper lugs 36, when inserting and removing the parts relative to the casing.

A substantially rectangular hopper 39 that tapers inwardly from its outer end, is formed or otherwise secured to the casing 7 and extends laterally therefrom at an upward inclination, as best shown in Figure 5, and registering with the hopper is a passageway 40 through the web member 28 for disposal of the material such as fruit or vegetables to be ground in the path of the cutter blades which set up a rasping action against the material, for cooperation with the grooves of the masticator cylinder to reduce the material to pulp. The pulp is carried by the blades through the grooves 25 in a clockwise direction for passage to the lower section 24 and the latter is perforated or provided with drain openings 41 for the juice in the pulp to strain therethrough into a drainage trough 42 that is formed on the underside of the casing along the length thereof, and the trough gradually increases in depth from its inner end to its outlet end, as clearly shown in Figure 4, so that the juice will flow freely therethrough by the action of gravity. The pulp is conveyed beyond the drainage trough to an outlet spout that includes an inner section 43 formed on the lower section 24 of the masticator cylinder, and registers with an outer section 44 formed on and depending from the casing at a lateral inclination, as likewise best shown in Figure 4.

Figure 1:
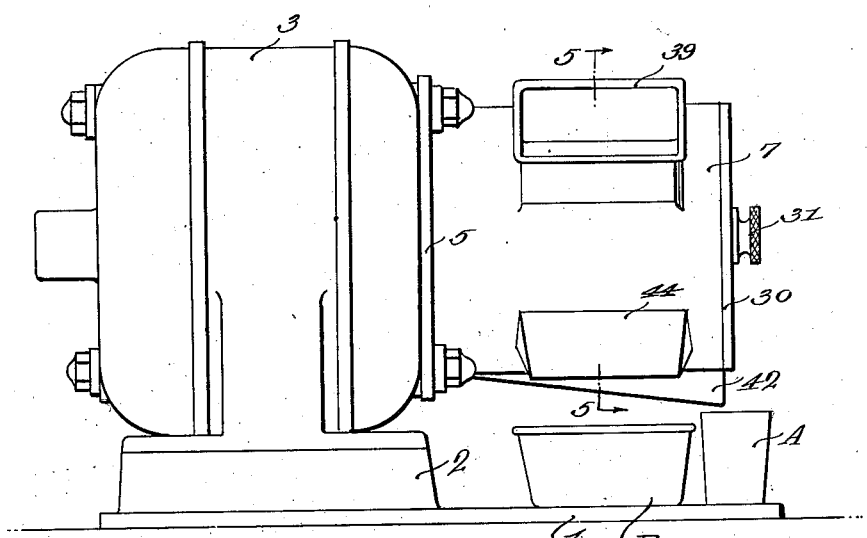
Figure 1 is a side elevation of the machine which forms the subject matter of the present invention.
Figure 2:
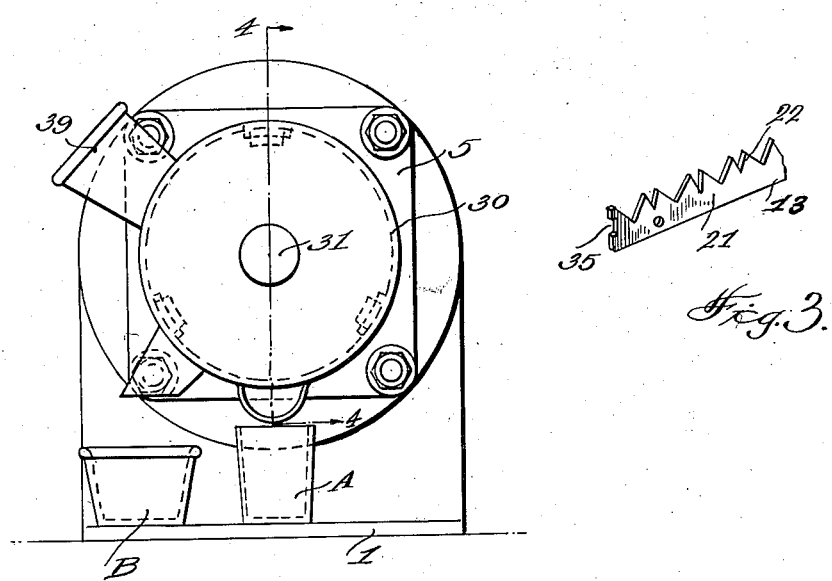
Figure 2 is a front view thereof.
Figure 3:
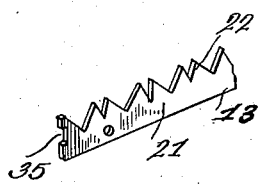
Figure 3 is a perspective view of a fragmentary portion of one of the cutter blades for the rotary grinding means.

From the above description and disclosure in the drawings, the operation of the machine will be obvious, but it might be mentioned that as long as material is placed in the hopper 39 and the machine is operating, the material will be reduced to fine pulp from which the juice will be extracted to flow through the trough for disposal into a receptacle A, while the pulp free from juice will pass through the outlet spout for disposal into a receptacle B, and it will be noted from Figures 1 and 2 that the casing 7 overlies the base plate 1 for the latter to provide supporting means for the receptacles.

While the lower section 24 of the masticator cylinder is perforated or provided with drain openings 41, in the form shown, a lower section that is imperforated may be substituted for the perforated section 24, and in that event the ground material in its entirety, that is the pulp and juice in a commingled state will be discharged through the outlet spout. An imperforated lower section is desirable when grinding nut meats or the like.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A grinding machine for food products, comprising a cylindrical casing, a rotary cutter including a drum mounted in the casing, toothed blades secured to and extending longitudinally of the drum, means for rotating the drum, removable means fixed in the casing in surrounding relation to the drum and provided with circumferentially arranged grooves for the teeth to travel therein, said grooves being shaped to fit the teeth and disposed in close proximity thereto, a hopper for receiving and directing the products to the rotary cutter, said fixed means having perforations in the lower portion thereof, an outlet trough for juice and secured to and extending longtiudinally of the bottom of the casing to underlie the perforations, said trough increasing in depth toward its outlet end, and outlet means for pulp.

2. A juice extracting machine comprising a cylindrical casing, a rotary cutter including a drum mounted in the casing and having longitudinally disposed grooves in the outer face thereof, toothed blades seated in the grooves, wedge means removably securing the blades in the grooves, means for rotating the drum, a cylinder fixed in the casing in surrounding relation to the drum and having circumferentially arranged grooves in the inner face thereof for the teeth to travel therein, the latter grooves being shaped to fit the teeth and disposed in close proximity thereto, a hopper for receiving and directing material to the rotary cutter, said hopper extending laterally from the casing at an upward inclination, said cylinder having perforations in the lower portion thereof, outlet means for juice and underlying the perforations, and pulp outlet means secured to the casing and disposed at an inclination laterally of the juice outlet means.

3. A juice extracting machine comprising a base, an electric motor mounted on the base, a cylindrical casing secured to the motor housing and having the armature shaft of the motor extending therein, a sleeve secured to the armature shaft, a rotary cutter including a drum removably secured to the sleeve, toothed blades secured to and extending longitudinally of the drum, a cylinder mounted in the casing in surrounding relation to the drum and provided with circumferentially arranged grooves for the teeth to travel therein, said grooves being shaped to fit the teeth and disposed in close proximity thereto, said casing having an open outer end, a cover closing said open end and removably secured to the casing, spring pressed means carried by the cover and bearing against the cylinder for holding the latter fixed within the casing, a hopper for receiving and directing material to the rotary cutter, outlet means for juice, and outlet means for pulp.

4. A juice extracting machine comprising a base, an electric motor secured to the base, a cylindrical casing secured to the motor housing and the armature shaft of said motor extending into the casing, a sleeve secured to the shaft and having a threaded end, a rotary cutter including a drum mounted on the sleeve, means threaded on said end for securing the drum to the sleeve, said drum having longitudinally disposed grooves in the outer face thereof, toothed blades seated in the grooves, wedge means securing the blades in the grooves and intersecting the latter, a cylinder made up of upper and lower sections and mounted in the casing in surrounding relation to the drum, said cylinder being provided with circumferentially arranged grooves in the inner face thereof for the teeth to travel therein, the latter grooves being shaped to fit the teeth and disposed in close proximity thereto, flanges formed on and extending outwardly from the ends of the cylinder and disposed in abutting relation with the cylindrical wall of the casing, said casing having an open outer end, a removable cover closing the open end, latching means for the cover, a spring pressed follower plate carried by the cover and bearing against said cylinder for holding the latter in place, a hopper for receiving and directing material to the rotary cutter, said lower section being perforated, outlet means for juice and underlying the perforations, and outlet means for pulp.

5. A juice extracting machine comprising a casing, a rotary cutter including a drum mounted in the casing, toothed blades secured to and extending longitudinally of the drum, the teeth of the blades being of substantially M-shape in outline and extending throughout the length thereof, means for rotating the drum, a cylinder removably fixed in the casing in surrounding relation with the drum and provided with circumferentially arranged grooves for the teeth to travel therein, said grooves being shaped to follow the shape of the teeth and disposed in close proximity thereto, said casing having an open end, a handled cover for said end, wedge like latching means for the cover, a hopper for receiving and directing material to the rotary cutter, said cylinder having a perforated lower portion, outlet means for juice and underlying the perforated portion, and outlet means for pulp.

MATTHEW J. THOMAS.